US012392524B2

(12) United States Patent
Bota

(10) Patent No.: US 12,392,524 B2
(45) Date of Patent: Aug. 19, 2025

(54) APPARATUS AND METHOD FOR PRODUCTION OF DUCT MEMBERS

(71) Applicant: CLEVELAND TOOL AND MACHINE LLC, Brook Park, OH (US)

(72) Inventor: Victor Bota, Middleburg Heights, OH (US)

(73) Assignee: CLEVELAND TOOL AND MACHINE LLC, Brook Park, OH (US)

( * ) Notice: Subject to any disclaimer, the term of this patent is extended or adjusted under 35 U.S.C. 154(b) by 0 days.

(21) Appl. No.: 18/106,200

(22) Filed: Feb. 6, 2023

(65) Prior Publication Data

US 2023/0173702 A1 Jun. 8, 2023

Related U.S. Application Data

(62) Division of application No. 16/619,511, filed as application No. PCT/US2018/014428 on Jan. 19, 2018, now Pat. No. 11,571,830.

(51) Int. Cl.

| | |
|---|---|
| ***F24F 13/02*** | (2006.01) |
| ***B21C 37/28*** | (2006.01) |
| ***B21D 37/08*** | (2006.01) |
| ***B21D 39/04*** | (2006.01) |
| ***B21D 51/10*** | (2006.01) |
| ***B26D 1/22*** | (2006.01) |
| ***B26D 3/16*** | (2006.01) |

(52) U.S. Cl.

CPC .......... *F24F 13/0245* (2013.01); *B26D 1/225* (2013.01); *B26D 3/161* (2013.01); *B26D 3/162* (2013.01); *B21C 37/28* (2013.01); *B21D 37/08* (2013.01); *B21D 39/048* (2013.01); *B21D 51/10* (2013.01); *Y10T 29/5142* (2015.01)

(58) Field of Classification Search

CPC ..... F24F 13/0245; B26D 3/161; B26D 3/162; B26D 1/225; B21C 37/28; B21D 39/04; B21D 39/048; B21D 53/06; Y10T 29/49444; Y10T 29/5142; B23P 15/00; B23P 21/002

See application file for complete search history.

(56) References Cited

U.S. PATENT DOCUMENTS

| | | | |
|---|---|---|---|
| 3,010,506 | A | 11/1961 | Bellatorre |
| 3,290,914 | A | 12/1966 | Vaill et al. |
| 3,724,255 | A | 4/1973 | Molino |
| 3,728,059 | A | 4/1973 | de Putter |
| 3,815,394 | A | 6/1974 | Walker |
| 3,861,184 | A | 1/1975 | Knudson |
| 4,198,842 | A | 4/1980 | Pawlaczyk |
| 4,210,090 | A | 7/1980 | Stubbings |

(Continued)

OTHER PUBLICATIONS

United States Patent and Trademark Office, International Search Report/Written Opinion, International Application No. PCT/US17/37451, Oct. 17, 2017, 20 pages, Alexandria, VA U.S.A.

(Continued)

*Primary Examiner* — Matthew P Travers

(74) *Attorney, Agent, or Firm* — Hahn Loeser & Parks LLP

(57) ABSTRACT

An apparatus for forming and sealing a duct member for use in an air handling system. At least one work station accommodates a work piece, which is generally a cylindrical tube.

15 Claims, 15 Drawing Sheets

(56) References Cited

U.S. PATENT DOCUMENTS

| | | | |
|---|---|---|---|
| 4,399,679 A | 8/1983 | King | |
| 4,418,943 A | 12/1983 | Ionna | |
| 4,466,641 A | 8/1984 | Heilman et al. | |
| 4,881,762 A | 11/1989 | Arnoldt | |
| 5,069,484 A | 12/1991 | McElroy | |
| 5,090,101 A | 2/1992 | Welty | |
| 5,102,253 A | 4/1992 | Conti | |
| 5,105,640 A | 4/1992 | Moore | |
| 5,189,784 A | 3/1993 | Welty | |
| 5,243,750 A | 9/1993 | Welty | |
| 5,436,423 A | 7/1995 | Welty | |
| 5,450,879 A | 9/1995 | Toben | |
| 5,685,345 A | 11/1997 | Gieseke et al. | |
| 6,047,584 A | 4/2000 | Filippo | |
| 6,105,227 A | 8/2000 | Bota | |
| 6,363,764 B1 | 4/2002 | Bota | |
| 6,378,184 B1 | 4/2002 | Bota | |
| 7,096,585 B2 | 8/2006 | Bota | |
| 7,159,428 B2 * | 1/2007 | Rieck | B21C 37/28<br>72/70 |
| 2002/0170328 A1 | 11/2002 | Mattsson | |
| 2004/0158986 A1 | 8/2004 | Munoz | |
| 2005/0028337 A1 | 2/2005 | Bota | |
| 2005/0044679 A1 | 3/2005 | Bota | |
| 2006/0283010 A1 | 12/2006 | Rieck | |
| 2010/0170318 A1 | 7/2010 | Lawler | |
| 2014/0259601 A1 | 9/2014 | Bota | |
| 2014/0283941 A1 | 9/2014 | Bailey et al. | |
| 2017/0320119 A1 | 11/2017 | Noh | |

OTHER PUBLICATIONS

United States Patent and Trademark Office, International Search Report/Written Opinion, International Application No. PCT/US18/14428, May 17, 2018, 13 pages, Alexandria, VA U.S.A.

Iowa Precision, Iowa Precision's Elbow Rotator, Mar. 14, 2012, Available at https://www.youtube.com/watch?v=kq7dZm5RVTI, entire document.

Iowa Precision, AEM Gearhead Machines, General Operations Manual, 1st Ed., Jun. 9, 1994.

Iowa Precision, "Adjust-A-Matic", printed from the Internet, http://www.iowaprecision.com/p6.htm, 1 page, Mar. 3, 1999.

* cited by examiner

APPARATUS AND METHOD FOR PRODUCTION OF DUCT MEMBERS

CROSS REFERENCE TO RELATED APPLICATION

This application is a Divisional application of U.S. application Ser. No. 16/619,511 filed Dec. 5, 2019 (now U.S. Pat. No. 11,571,830 issuing on Feb. 7, 2023), which is a national phase application of PCT International Application No. PCT/US2018/014428, filed Jan. 19, 2018, which claims priority to, and the benefit of PCT International Patent Application No. PCT/US2017/037451, filed Jun. 14, 2017 with the U.S. Patent Office (acting as the U.S. Receiving Office). The disclosures of the above-referenced applications are incorporated herein by reference in their entirety.

TECHNICAL FIELD

The invention relates generally to an apparatus and method for production of sealed or adjustable duct members.

BACKGROUND

In general, duct work is commonly used in forced air heating and air-conditioning systems for buildings and the like, with the duct work providing a distribution system to various areas of the building from a furnace and/or air-conditioning system. The duct work is generally formed from cylindrical tubing which extends to various portions of the building or the like. Duct members include specialized sections such as elbows, which may be fixed in position or allow the orientation and position of duct to be adjusted, to make turns in runs of ductwork. Known machines for producing elbows or the like typically require a skilled operator that must handle a blank used for production of the elbow. The operator cuts and forms sections or gores for an elbow from the blank and assembles them together. The sections of the elbow are generally coupled to an adjacent section by means of a bead coupling which locks the pieces together. Known machines for producing elbows require the stages of production of the sections to be performed manually. A skilled operator is therefore necessary to properly form each section and couple the sections together. The difficulty of properly forming each section and connecting the sections together result in a high percentage of scrap.

Other problems associated with these machines include the loss of air through the connections or beads between the gores of the duct system. As air circulates through the duct system, air dissipates through the connecting beads or seams that are between the gores, which in turn, causes a loss of energy and thus creates a less efficient system. Sealing of the duct increases the efficiency of the HVAC system, and conserves energy, which is highly desirable. The sealing of such duct members has generally been performed after installation using tape or mastic for example, which though helping to prevent the egress of air, is not particularly efficient and increases the cost of installation. There have been attempts to produce sealed duct members, which are then installed, but the machines used to form such duct members require significant operator handling and pose safety hazards to the operators. The production process also takes significant time, thereby increasing the cost. There is thus a need to have an apparatus and method for automated manufacture of elbow ducts that may be sealed to be highly efficient with respect to the preventing leakage therefrom.

SUMMARY

The invention is therefore directed in one respect to an apparatus for forming a sealed duct member for use in an air handling system. The apparatus comprises at least one work station adapted to accommodate a work piece. A cutting assembly is configured to cut the work piece in a predetermined manner to form first and second sections. A forming assembly including a forming member and at least one die member to form a connecting bead in the first and second sections which cooperate to reconnect the first and second sections together at a predetermined position. A work piece moving and rotating assembly moves the work piece relative to the cutting assembly and forming assembly, wherein the rotating assembly allows for rotation of the work piece and at least one of the first and second sections after being formed. A sealing assembly is further provided which cooperates with the at least one die member to seal the connecting bead in the first and second members after the connecting bead is formed. The sealing assembly comprises at least one crimping plate that forces the at least one die member against the formed connecting bead to crimp the connecting bead together. A control system is provided for controlling operation of the cutting, forming, work piece moving and rotating assembly and sealing assemblies.

The invention also relates to a method of automated manufacturing of a duct member. The method includes providing a work piece having a cylindrical configuration and positioning the work piece in a work station at a first predetermined position. A clamping system includes a first clamp to secure the work piece in a first predetermined position, and the work piece is moved to the position where a first cut is to be made and may be rotated 180 degrees clockwise. A second clamp is activated to secure the work piece in a second predetermined position, and a cutting operation is performed to cut the work piece at a first predetermined position to form first and second sections. The first section is moved toward the second section a predetermined amount and a turning head is engaged to the interior of the second section. The second section is then rotated 180 degrees clockwise and the turning head is disengaged. A forming operation is initiated to form connecting beads in each of the first and second sections to reconnect the sections, and a crimping system seals the formed connecting beads together. The second clamp is then opened to release the work piece. The work piece is then moved to the position where a second cut is to be made and rotated 180 degrees counter clockwise. A second clamp is activated to secure the work piece in a predetermined position, and a cutting operation is performed to cut the work piece at a first predetermined position to form first and second sections. The first section is moved toward the second section a predetermined amount and a turning head is engaged to the interior of the second section. The second section is then rotated 180 degrees clockwise and the turning head is disengaged. A forming operation is initiated to form connecting beads in each of the first and second sections to reconnect the sections, and a crimping system seals the formed connecting beads together. The second clamp is then opened to release the work piece. The work piece is then moved to the position where at least a third cut is to be made and rotated 180 degrees clockwise. A second clamp is activated to secure the work piece in a predetermined position, and a cutting operation is performed to cut the work piece at a first predetermined position to form first and second sections. The first section is moved toward the second section a predetermined amount and a turning head is engaged to the interior of the second section. The second section is then rotated 180 degrees clockwise and the turning head is disengaged. A forming operation is initiated to form connecting beads in each of the first and second sections to reconnect the sections, and a crimping system seals the formed connecting beads together. The second clamp is then opened to release the work piece.

These and other features of the claimed invention, as well as details of illustrated examples thereof, will be more fully understood from the following description and drawings.

Figure 8:
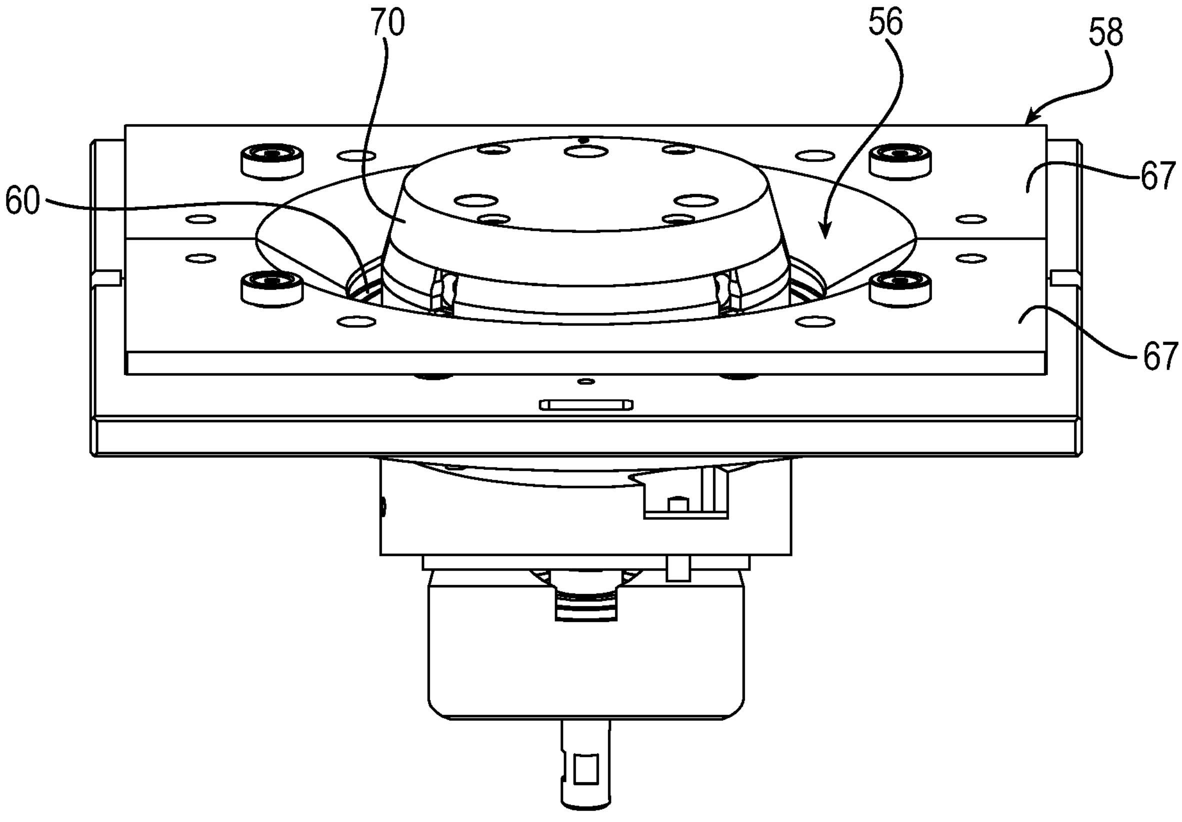
FIG. 8 is a perspective view of die members and a cutting and forming assembly in the apparatus of FIG. 3.
Figure 11:
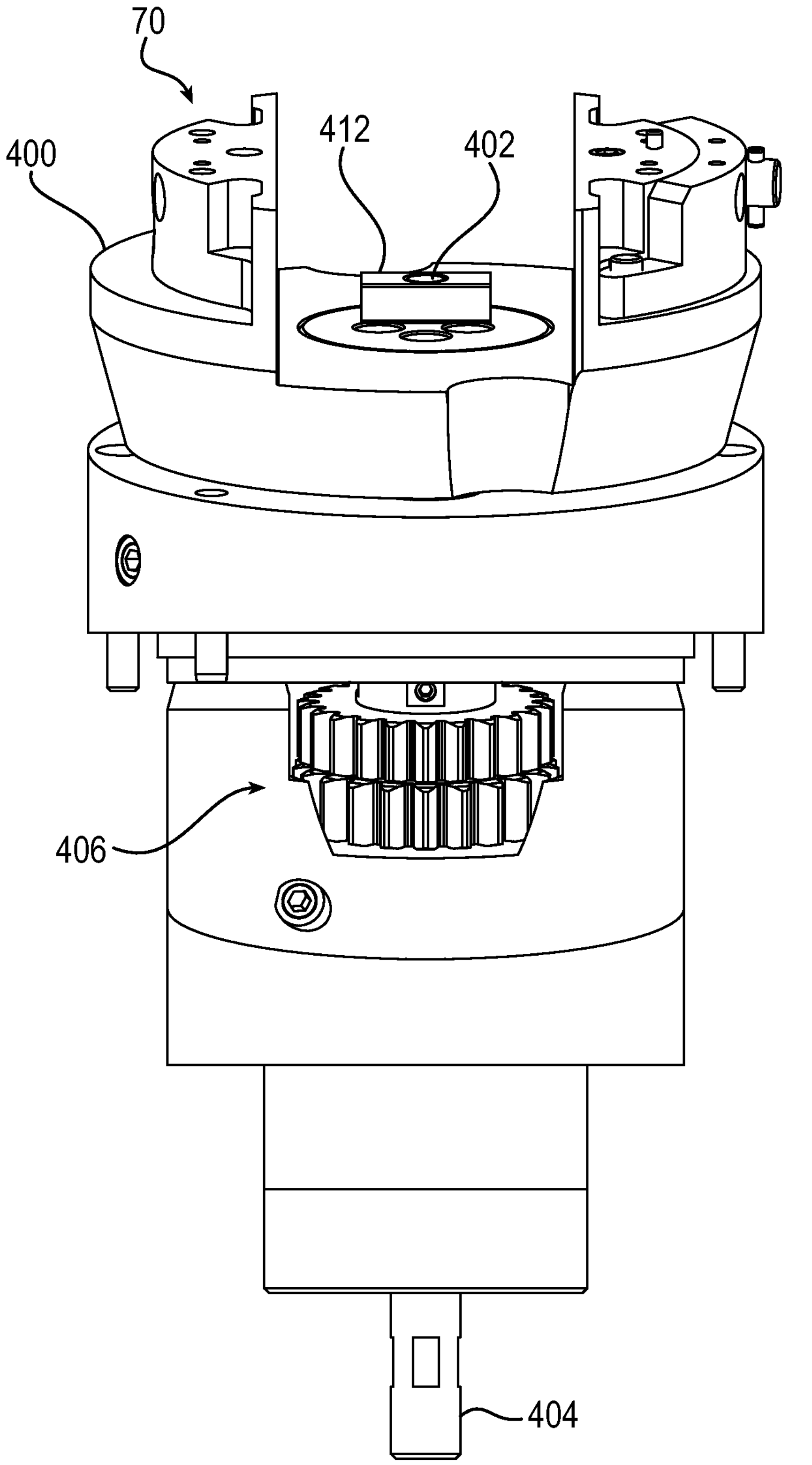
Figure 12:
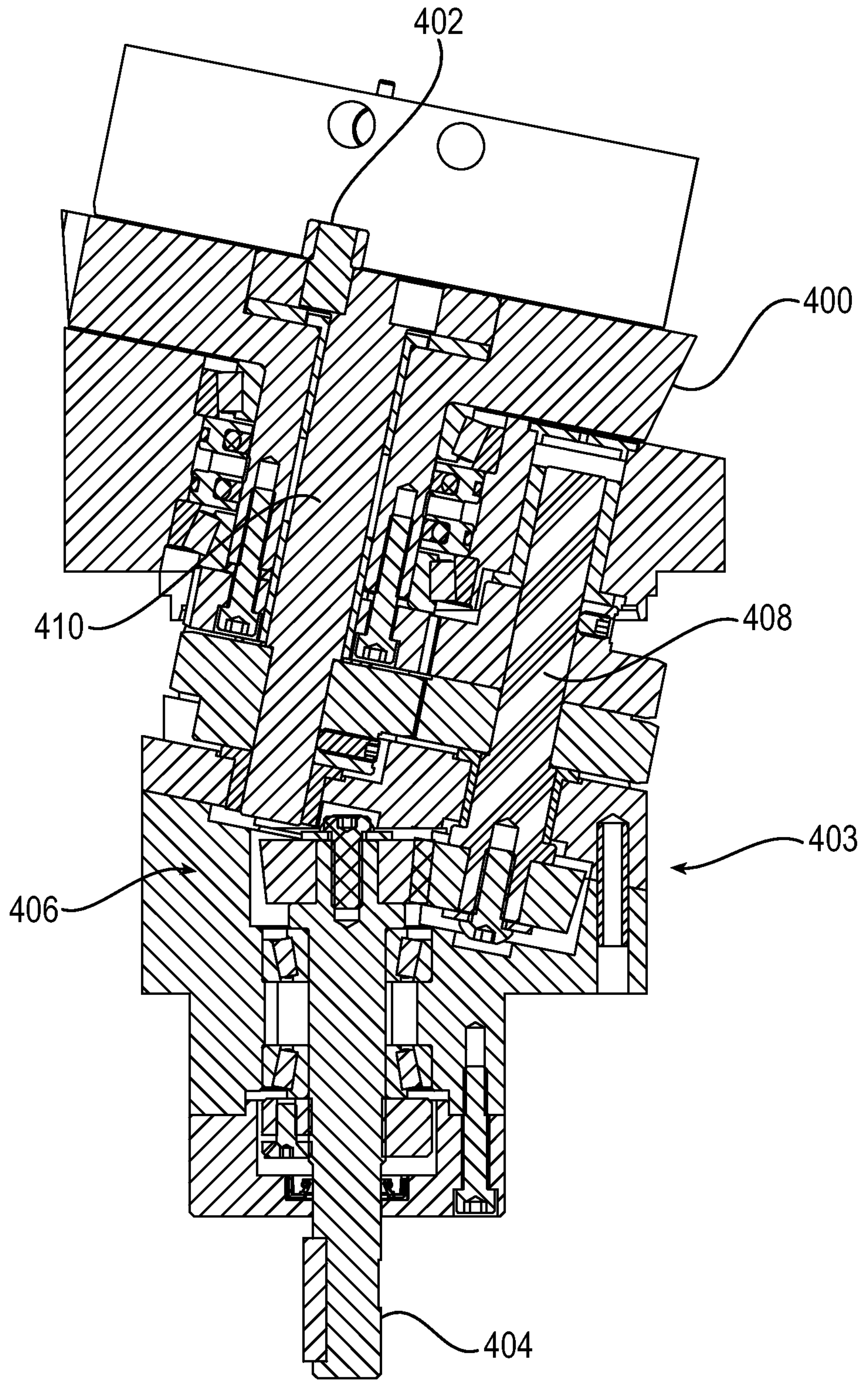
Figure 13:
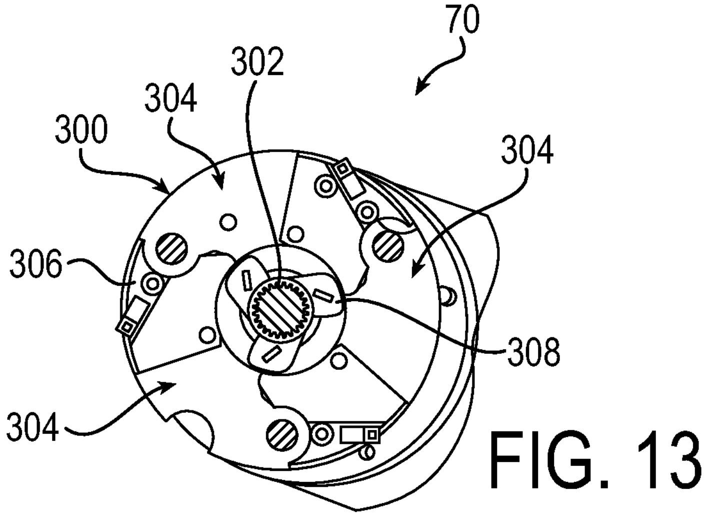
Figure 14:
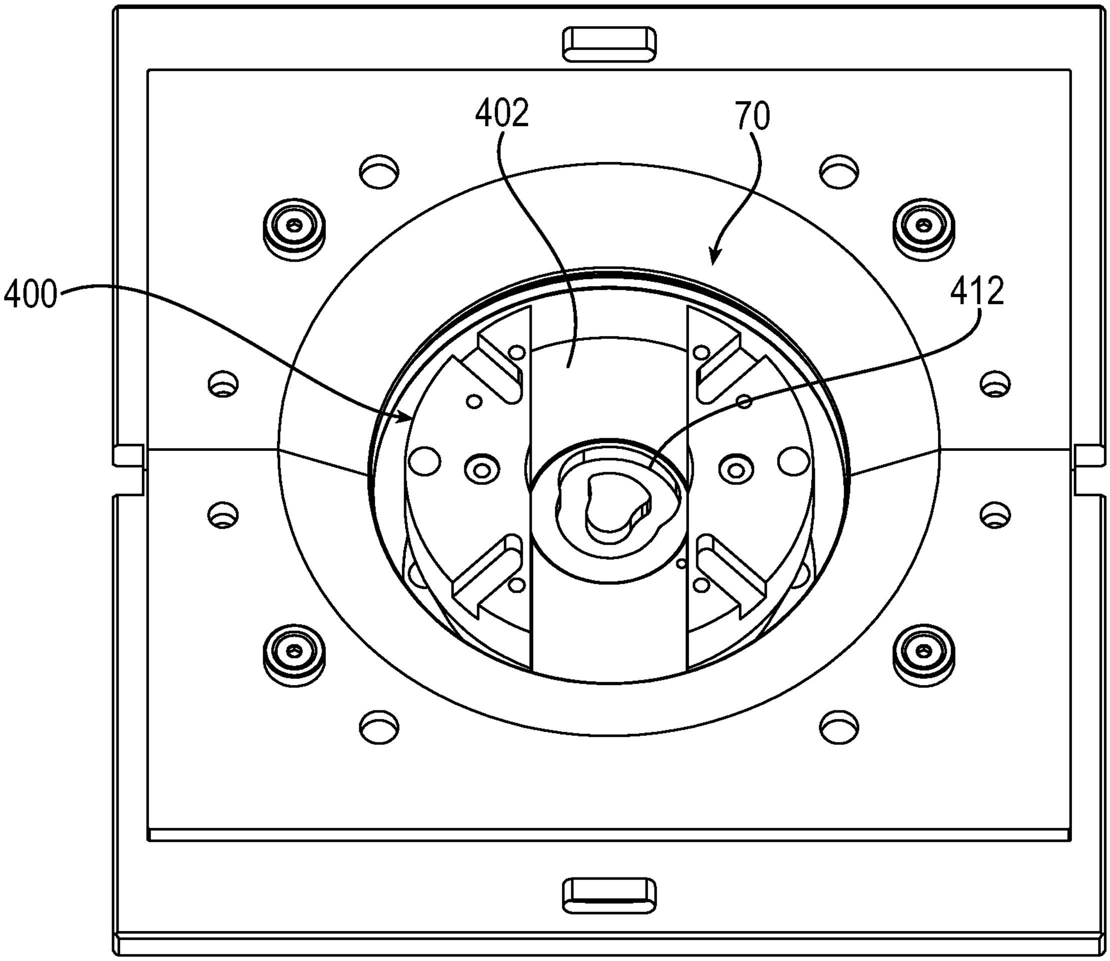
Figure 15:
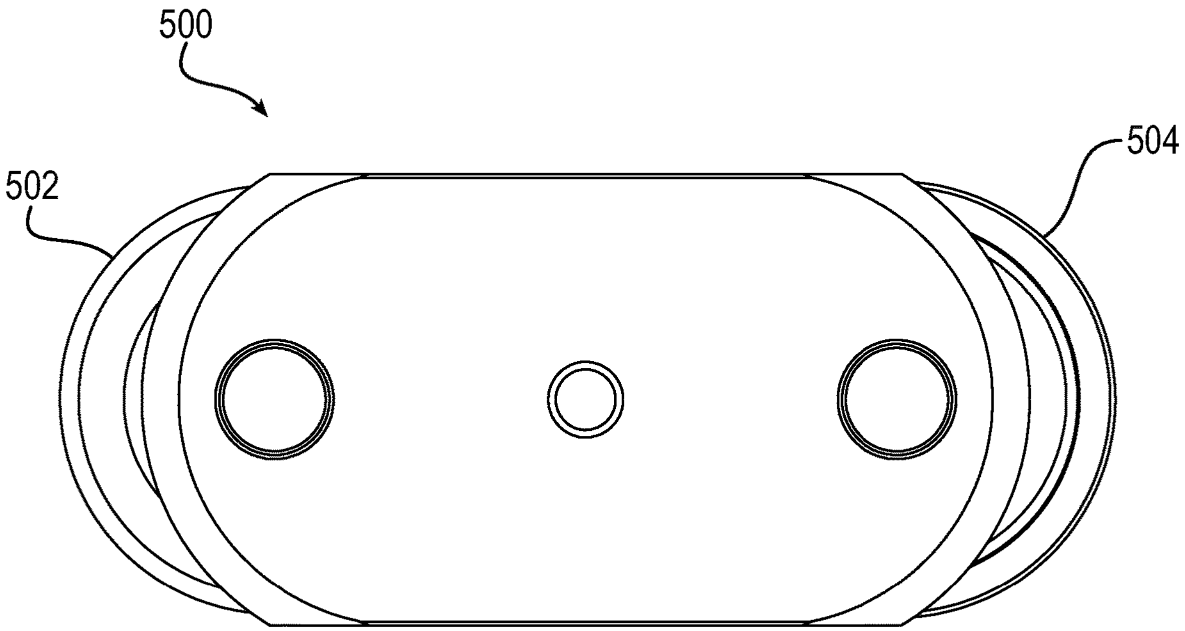
Figure 16:
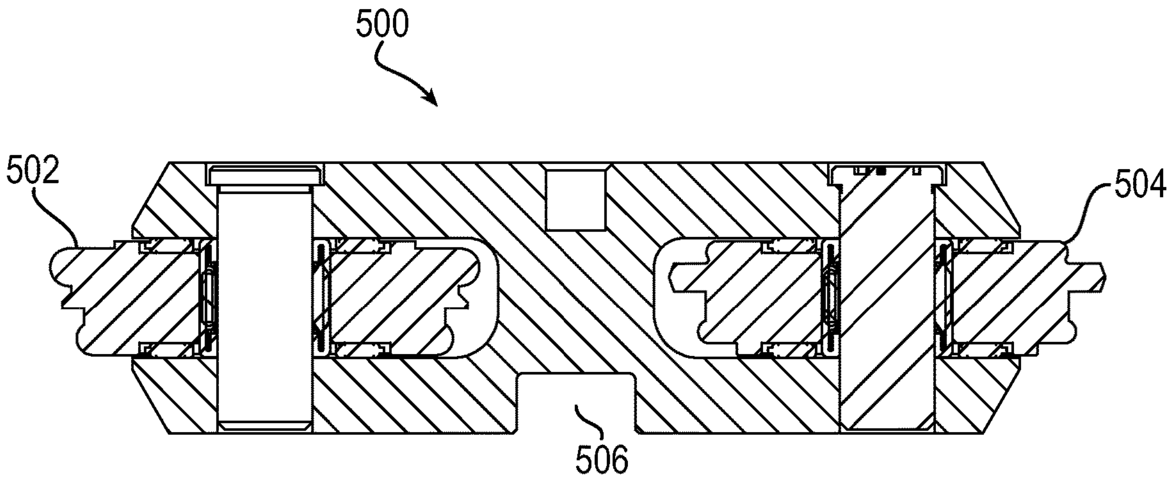
Figure 17:
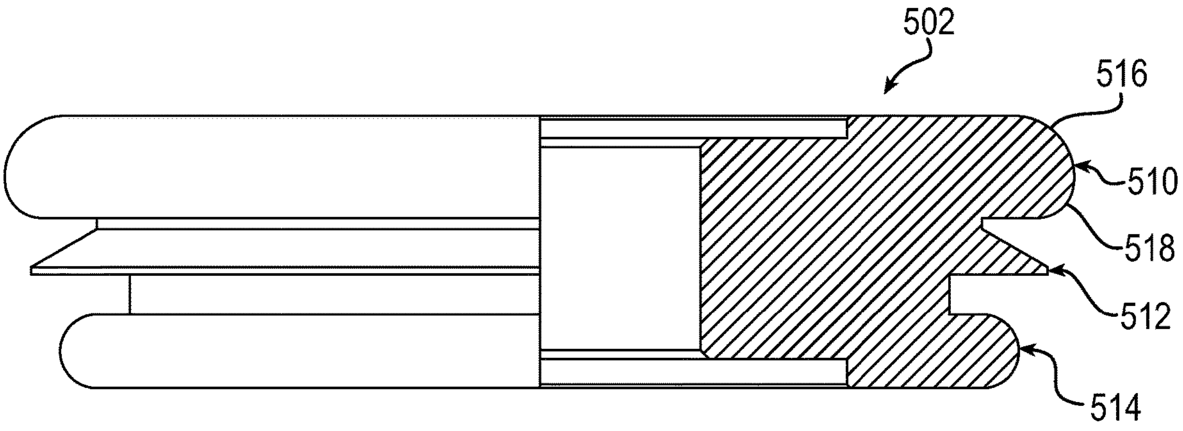
Figure 18:
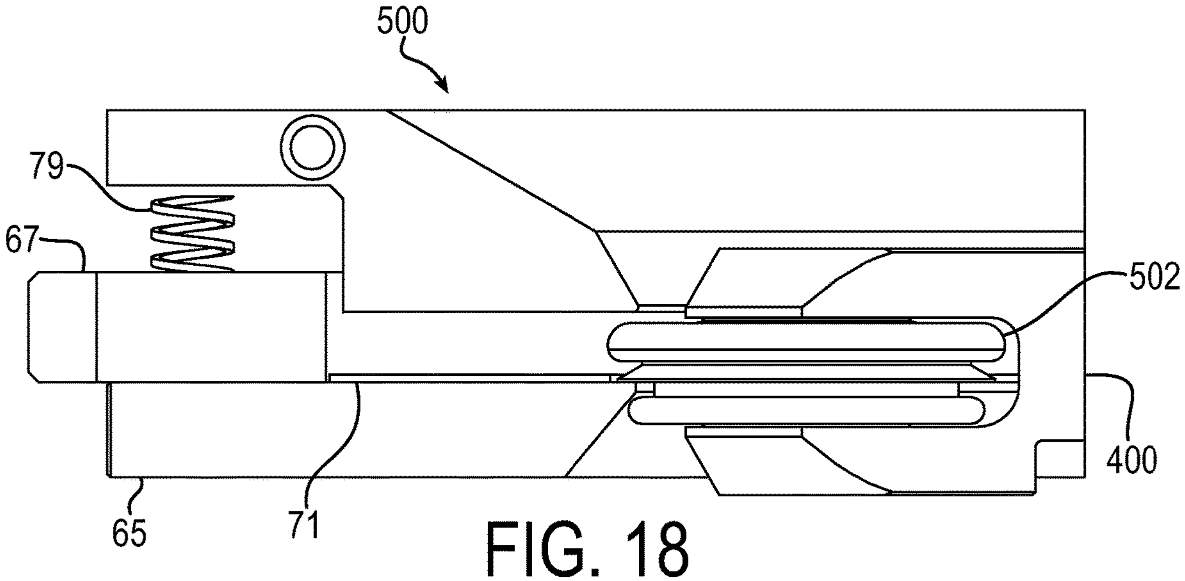
Figure 19:
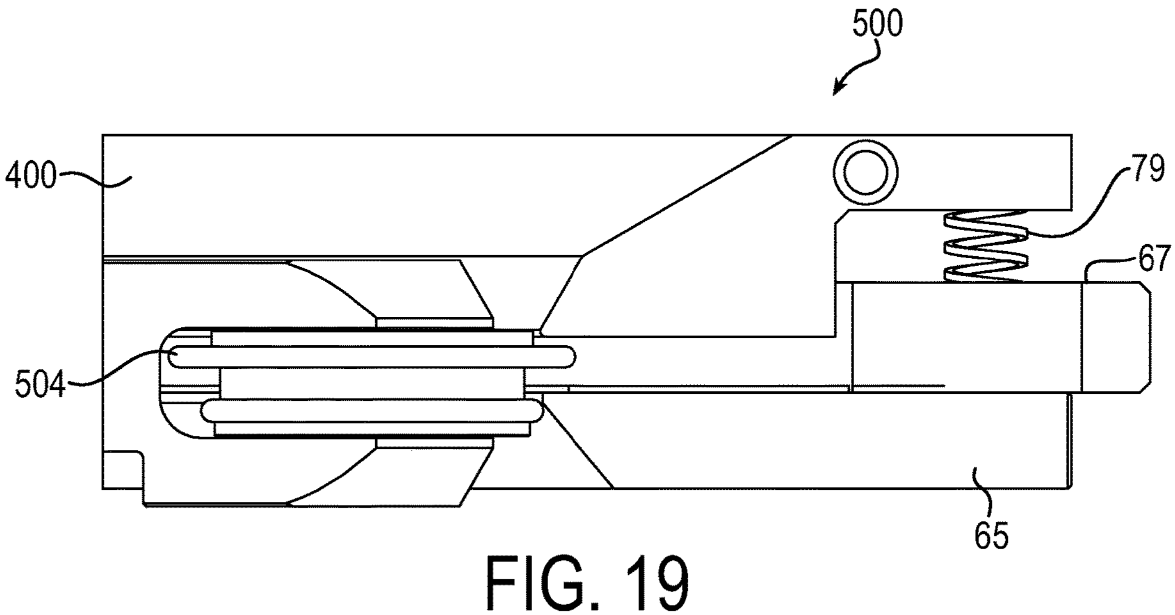
Figure 20:
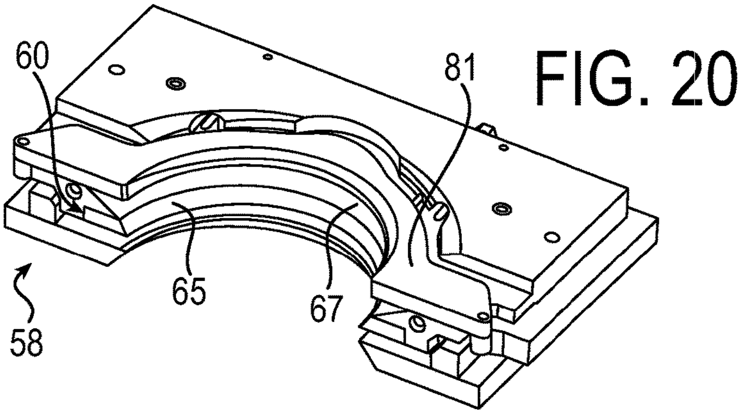
Figure 21:
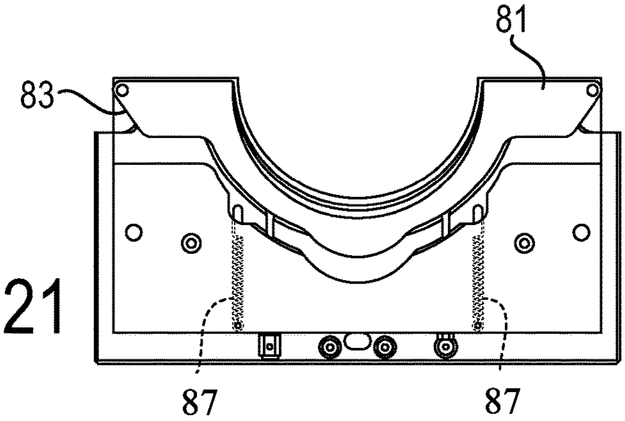
Figure 22:
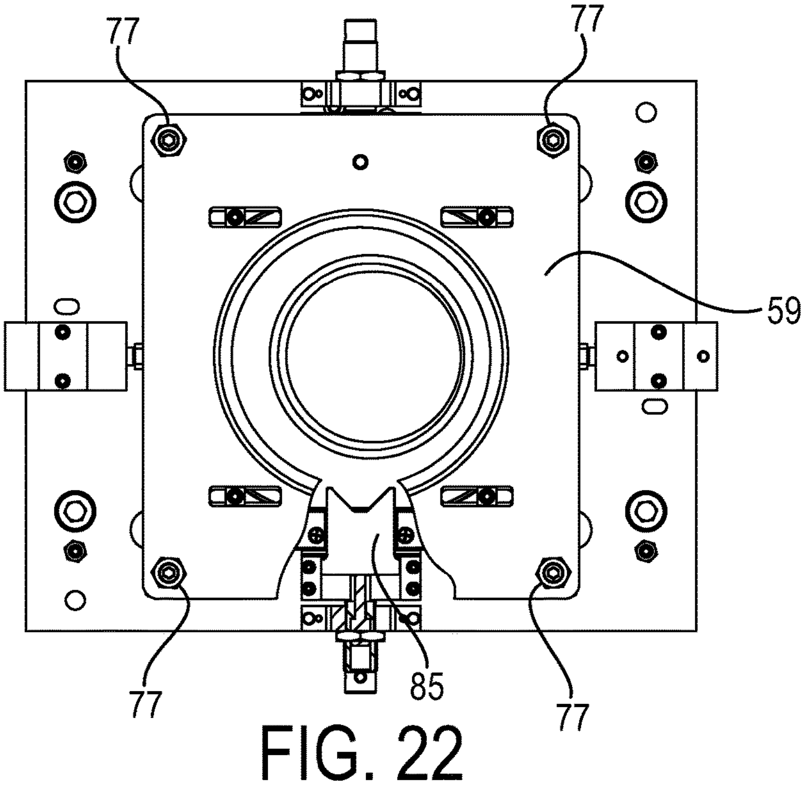
Figure 23:
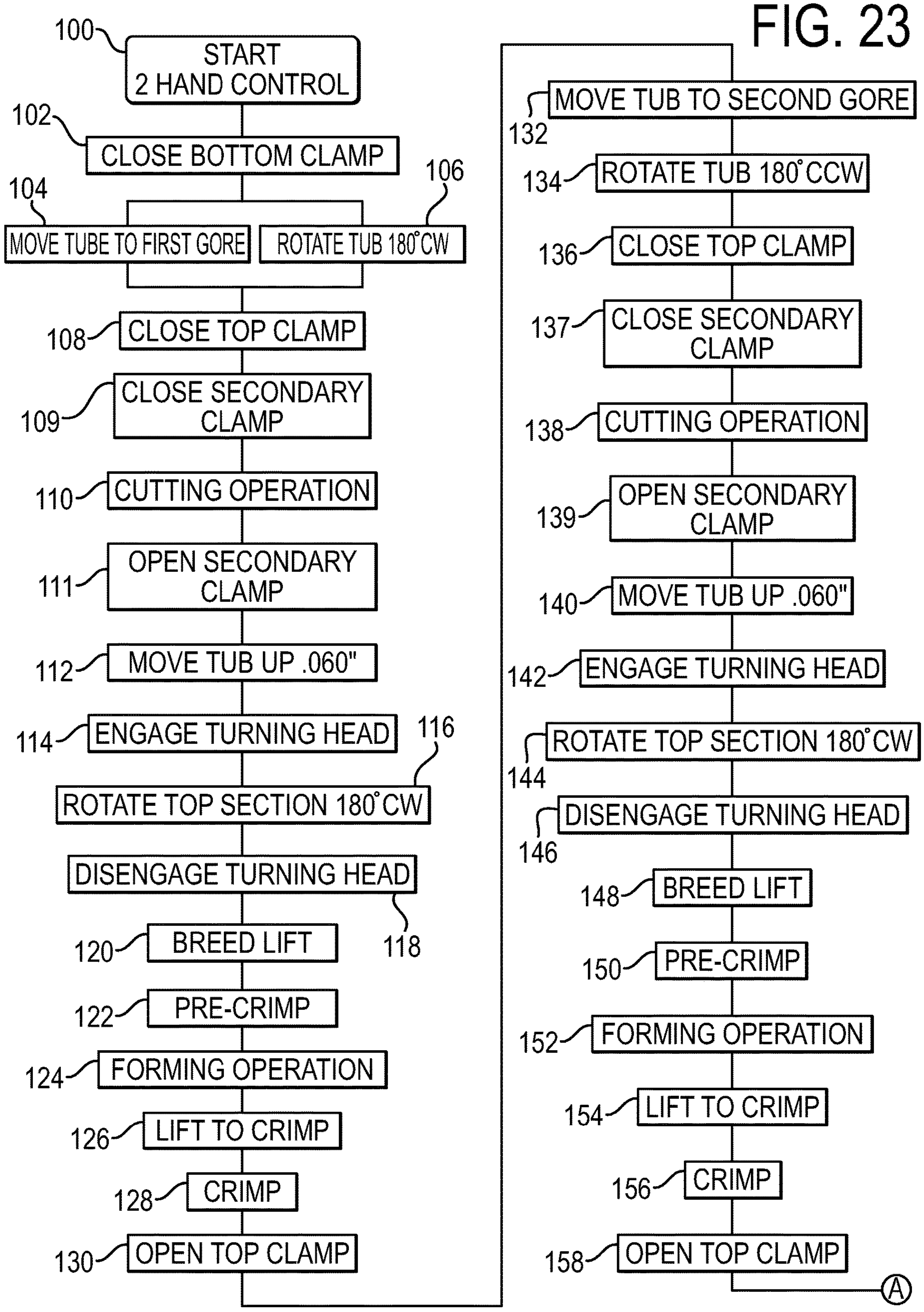
Figure 23:
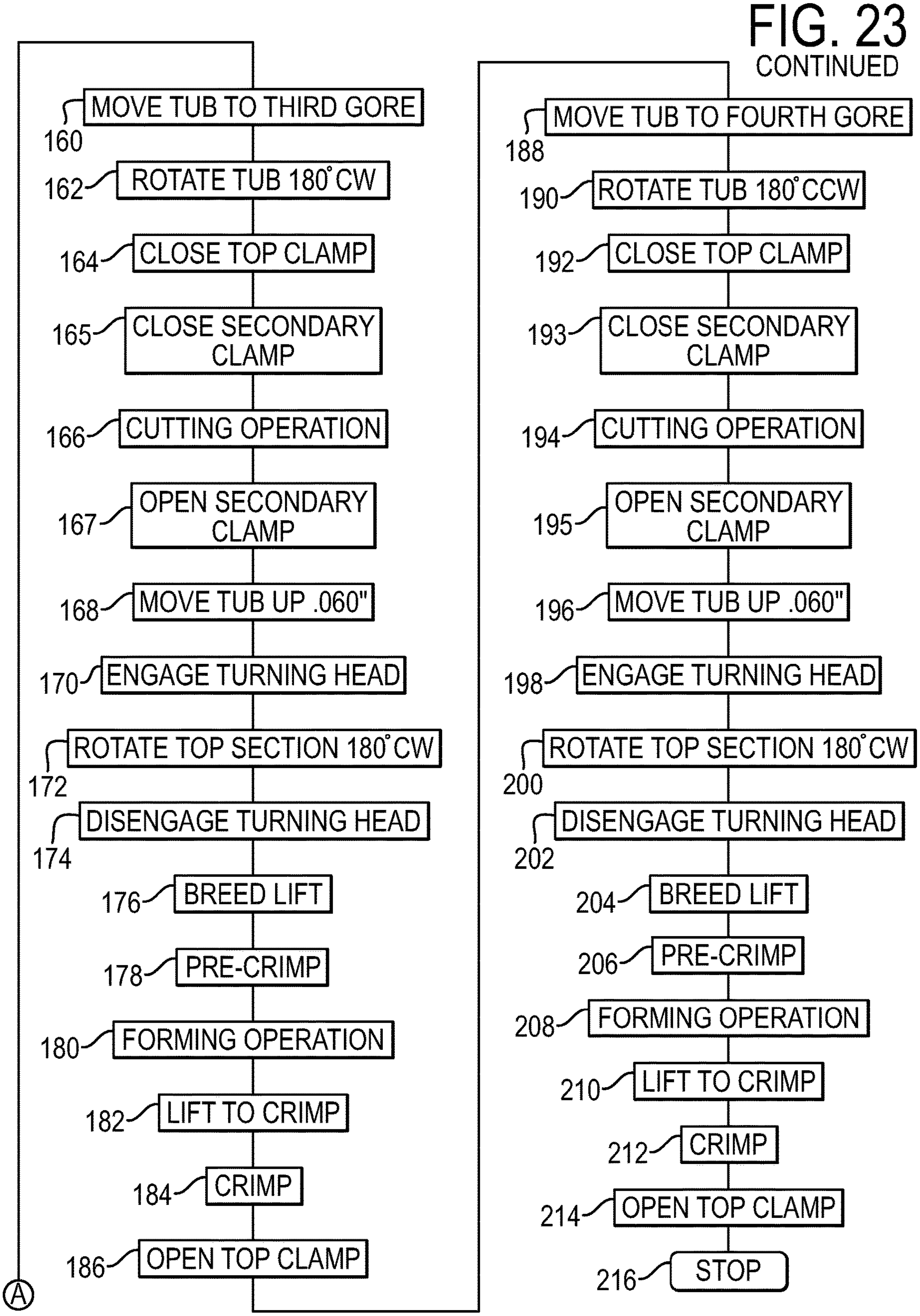
Figure 24:
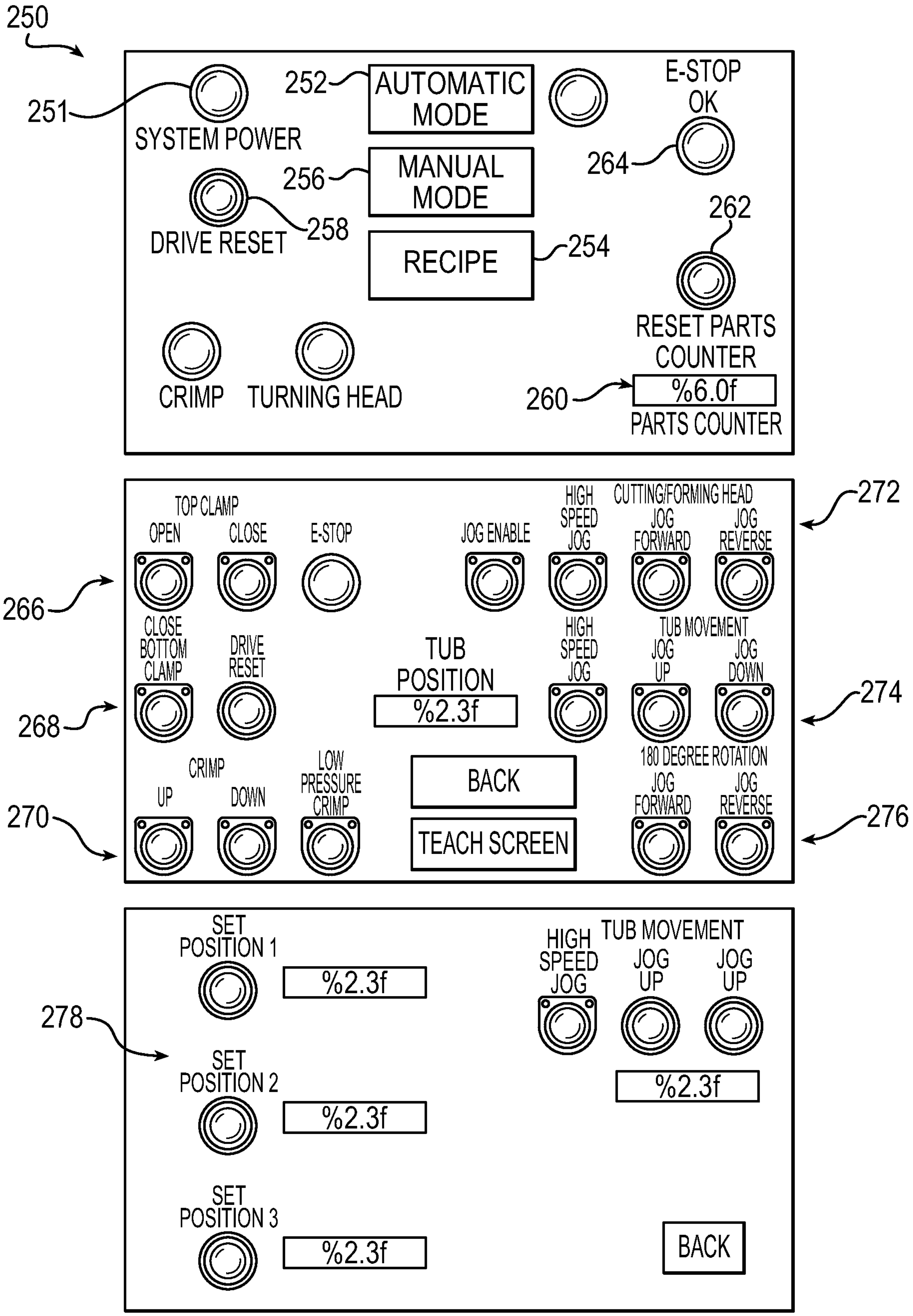

FIGS. and 9 and 10 show sectional view along the line A-A of FIG. 8, showing different operational states;

FIG. 11 is a view of a cutting and forming head according to an example;

FIG. 12 is a cross-sectional view of the cutting and forming head as shown in FIG. 11;

FIG. 13 is a partial perspective view of the cutting and forming head and associated die members of an example machine;

FIG. 14 is a top view of a cutting and forming cassette according to an example, for use in the cutting and forming head;

FIG. 15 is a cross-sectional view of the cutting and forming cassette as shown in FIG. 14;

FIG. 16 is a partial cross-section of a cutting wheel associated with the cutting and forming cassette as shown in FIG. 14;

FIG. 17 is a partial view of the cutting wheel associated with a cutting and forming cassette in association with die members of an example machine;

FIG. 18 is a partial view of a forming wheel associated with a cutting and forming cassette in association with die members of an example machine;

FIG. 19 is another example of a cutting and forming head of an example machine;

FIG. 20 is a perspective view of a portion of a die assembly associated with an example machine;

FIG. 21 is a top view of the portion of a die assembly as shown in FIG. 20;

FIG. 22 is a top view of a portion of an example machine showing a crimping system;

FIG. 23 is a block diagram showing operation of the apparatus according to an example; and FIG. 24 shows an example operator interface to the control system for operation of the apparatus.

DESCRIPTION OF EXAMPLES OF THE INVENTION

Figure 1:
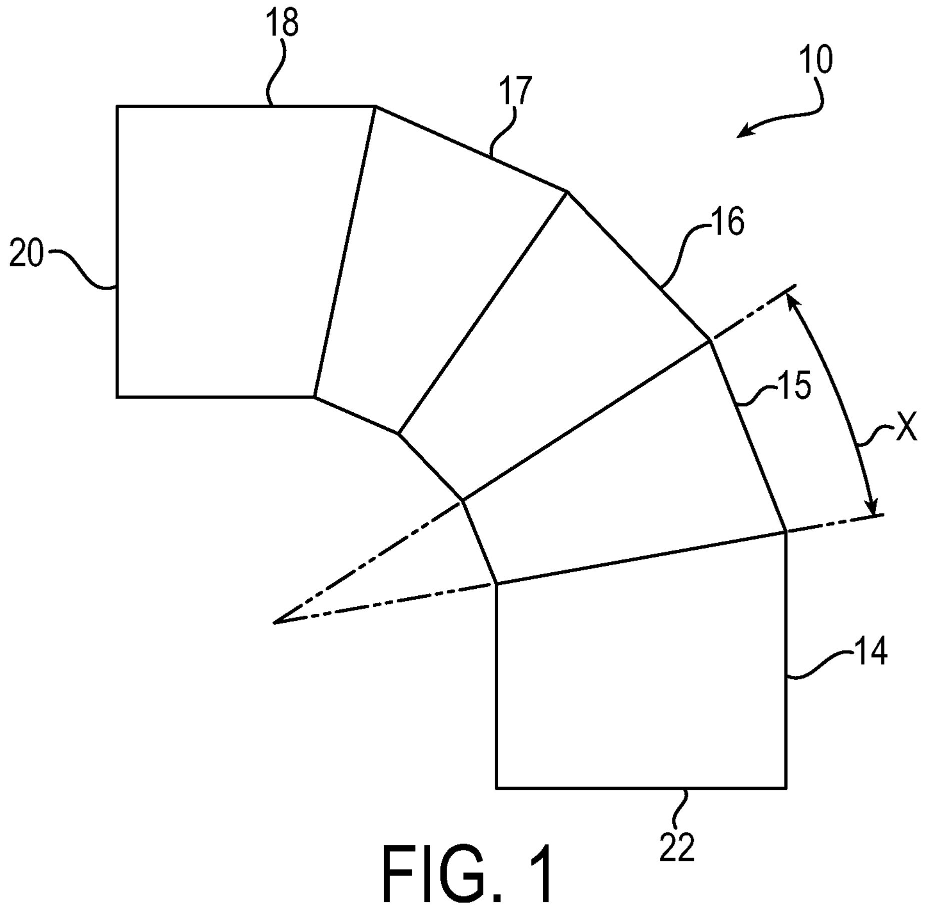
FIG. 1 is a plan view of a duct member as formed according to an example of the invention.
Figure 2:
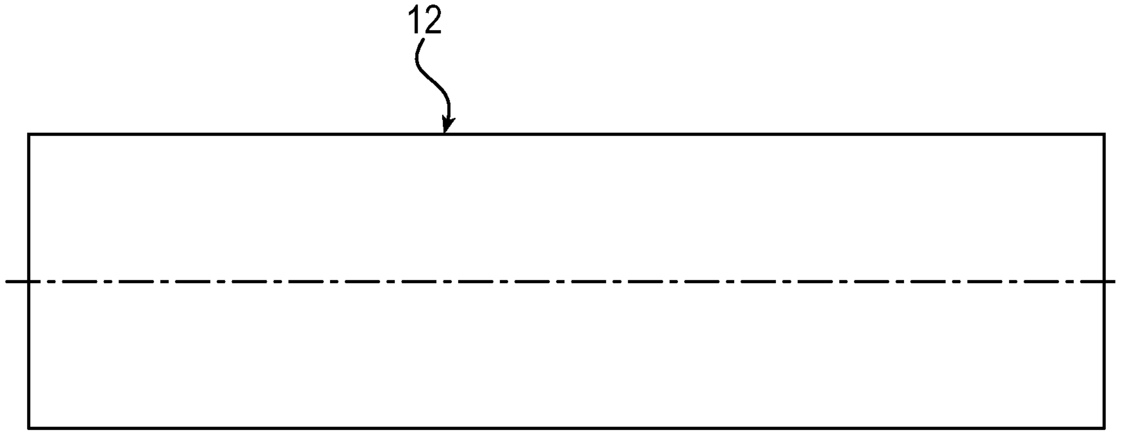
FIG. 2 is a plan view of the tube or work piece used as a blank to form the cut member of FIG. 1.

Turning now to FIGS., an example of the invention is directed at producing an elbow duct member 10 such as shown in FIG. 1, wherein the duct member 10 is formed from a cylindrical tube 12 as shown in FIG. 2. The elbow duct member 10 may be a ninety degree elbow as shown, or a forty-five degree elbow for example. To form the duct 10, the tube 12 is cut into gores or sections 14-18 that are then re-attached to form the elbow configuration. In this example, the duct 10 is shown as a 90 degree elbow, which may be formed by cutting of the tube 12 with four cuts at increments of 22.5 degrees apart as shown at x, to form the 90 degree elbow configuration, but other configurations may be formed, such as from three sections cut in 30 degree increments for example. In this example, the sections or gores 14-18 are re-attached by a connecting bead, with a portion of one section positioned in overlapping relationship, and connected together at that location via the connecting bead. The duct member 10 further includes a first opening 20 and a second opening 22, being adapted to be coupled between other duct members in a duct system. Though not shown, to facilitate connection of the duct member 10, an opening may be crimped for engagement with an inner wall of anther duct member. The tube 12 may be produced from a flat blank of material which is rolled with opposed seams of the blank coupled to one another to form the tubular configuration. As an example, the tubular configuration of the formed blank of material may provide a starting work piece 12 as shown in FIG. 2, which may then be operated on by the apparatus and methods of the invention. The work piece 12 as shown in FIG. 2 is designed to have a predetermined diameter for use in the apparatus and methods of the invention, but any suitable particular dimensional characteristics of the work piece can be accommodated.

The apparatus and methods of the invention may be operated to take the work piece 12 as shown in FIG. 2 and produce the duct member 10 of FIG. 1 automatically into the final preferred form, which may be without operator intervention.

Figure 3:
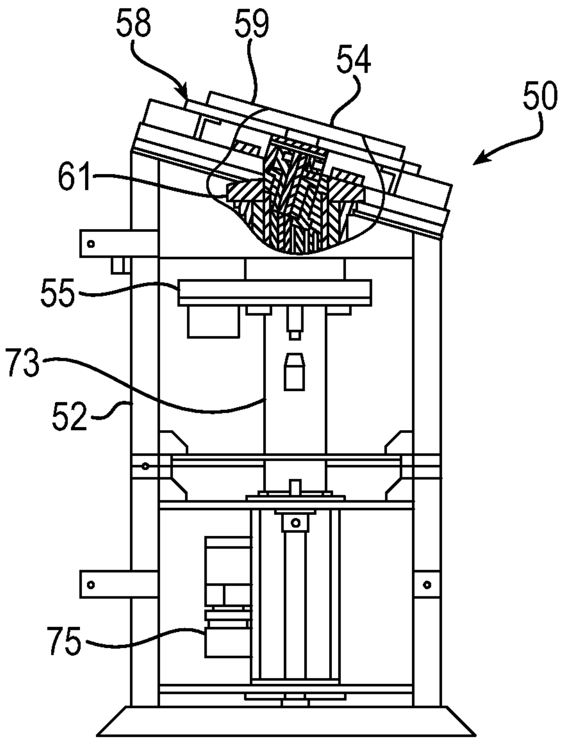
FIG. 3 is a side view of an example of the apparatus for automated cutting and forming of an elbow or like duct member.
Figure 4:
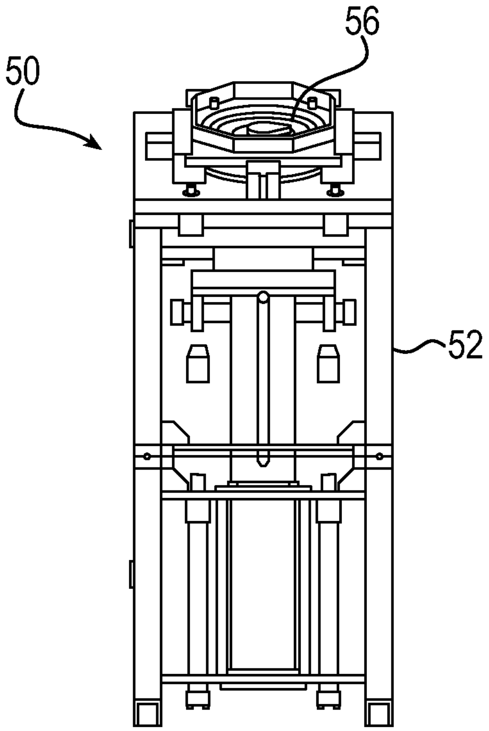
FIG. 4 is a side view of the apparatus as shown in FIG. 3.
Figure 5:
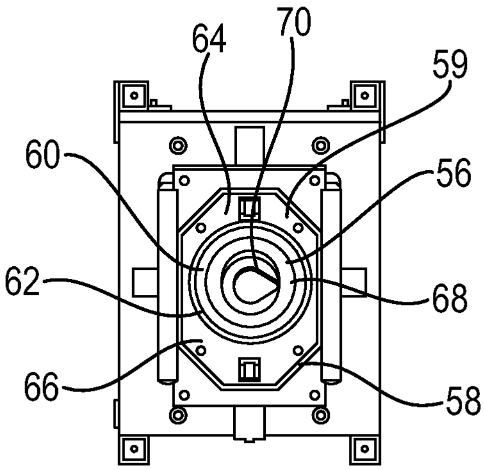
FIG. 5 is a top view of the apparatus as shown in FIG. 3.

Turning now to FIGS. 3-5, an example of the apparatus for forming the elbow duct is shown in more detail. The apparatus generally designated 50 includes a housing or frame construction 52 which supports various components of the apparatus. Housing or frame 52 includes an upper surface 54. The upper surface 54 is angled at a predetermined angle relative to horizontal or ultimately to the plane of the outlet opening on the tube 12 described previously. The top includes a nest 56 for receipt of the work piece 12 to perform the operations for cutting and forming the elbow duct member 10. The nest 56 includes a die and crimping assembly 58 supported adjacent the nest 56, which in this example comprises first and second semicircular die members 60 and 62 which are positioned on opposed sides of the nest 56. The die members 60 and 62 may be stationary, or may be made moveable toward and away from the nest 56 if desired. The die members are positioned beneath a crimping plate 59, that is moveable toward the die members 60 and 62. Within the nest 56, a cutting and forming system 70 is provided. The cutting and forming system 70 may include a turning head with levers in association with a forming head with a plurality of cassettes that carry cutting and forming wheels that are movable into engagement with the work piece, such as by cam biasing. Alternately, the cassette may be movable by an eccentric drive, such as shown and described in U.S. Pat. No. 6,105,227 or 6,363,764 as examples, which are hereby incorporated by reference. Between the die members 60 and 62 and the cutting and forming system 70, a channel is formed to accept the work piece 12 as shown in FIG. 2, with the work piece 12 extending into the channel to a predetermined depth. A moveable support surface or tub 68 is provided at the bottom of channel, on which the work piece is supported within the nest 56 and moved to predetermined positions relative to the die members 60 and 62 and cutting and forming system 70. A moving assembly 55 (FIG. 3) is provided to move the tube 12 to desired positions relative to the forming head and die members. The moving assembly 55 may move the work piece 12 by any suitable mechanism. The cutting and forming assembly 70 extends through the moveable support surface or tub 68, and is connected to a drive system 73 and drive motor 75. Also associated with the channel and tub 68 is a holding system and rotating system to clamp the cut section of work piece 12 into a desired position and rotate the work piece sections or gores thereof relative to one another, to form the desired duct member.

Figure 6:
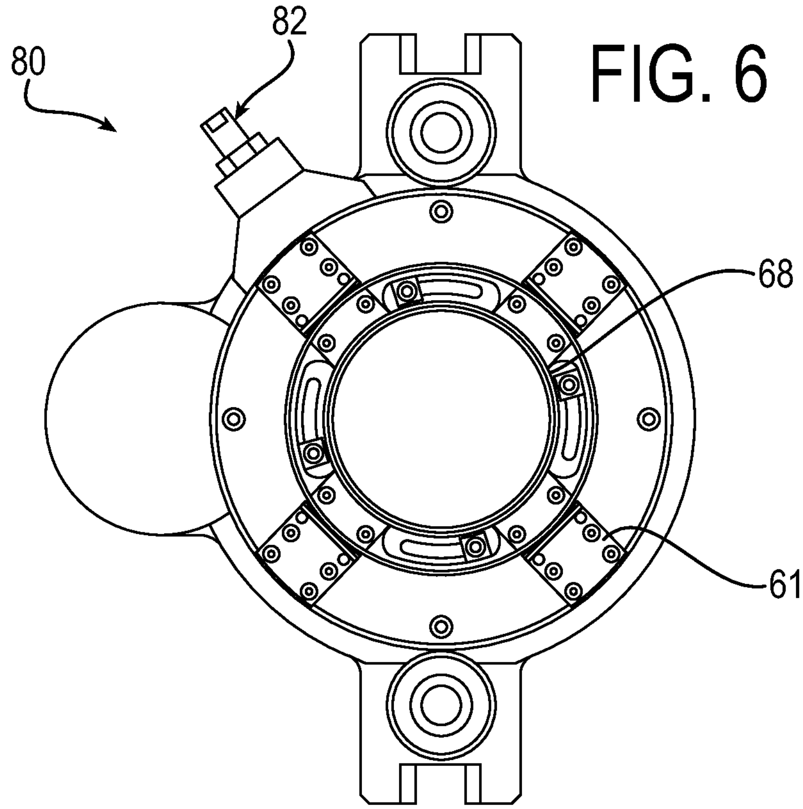
FIG. 6 is a top view of a zero stop system associated with the apparatus.
Figure 7:
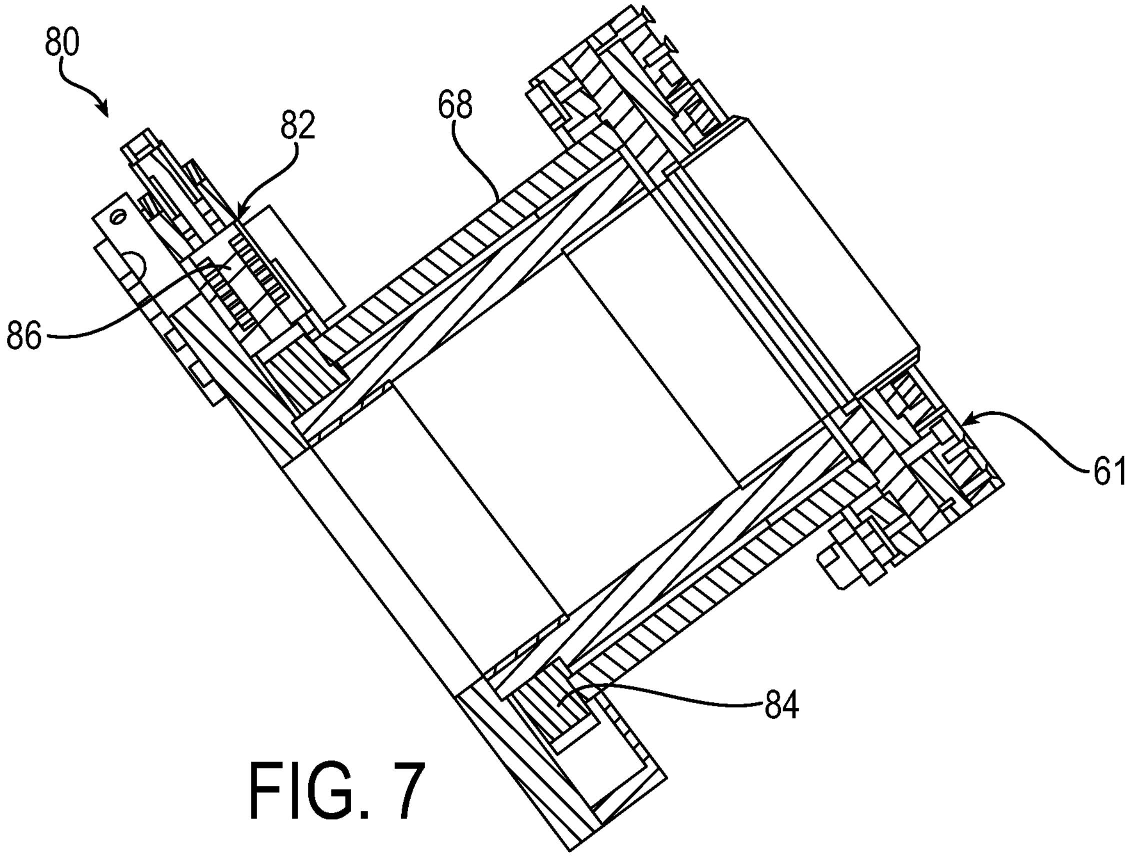
FIG. 7 is a sectional view taken along line A-A in FIG. 6.

In this example, there is also provided a zero hard stop system 80 as shown in FIGS. 6-7, which is provided to ensure proper rotation of tub 68 and the section of the work piece supported thereon. The hard stop system 80 may include a stop member 82 that will engage the main rotating gear 84 on the tub 68 to prevent movement during the cutting and forming operations, and ensure the 90 degree elbow configuration is accurately generated. In an example, the stop member 82 is a spring loaded pin 86 that is and suitably actuated to engage the gear 84 and prevent any movement of the tub 68 or the work piece section held therewith during the cutting and forming operations.

The holding systems 64 may include an upper holding system 63 and a lower holding system 61 to clamp the work piece 12 the upper and lower sections or gores of the work piece 12 after being cut, to then be reconnected. Any suitable holding system may be provided, such as including a clamp assembly comprising one or more clamp members which are actuated to grip a surfaces of the work piece 12 above and below a cut. As seen in FIGS. 6 and 7 for example, a lower holding system 61 may include a plurality of clamps situated around the tube 68 to secure the work piece in position therewith. A rotating system may be employed with the bottom and/or top holding systems 61 and 63, which may be a separate system to the holding systems 61 and 63, to rotate and/or position each section of work piece 12 at a desired position relative to the other section after cutting. The work piece 12 and sections are securely held in place as cutting, forming and rotation operations are performed thereon, and the sections are re-attached and sealed as will hereafter be described.

Figure 9:
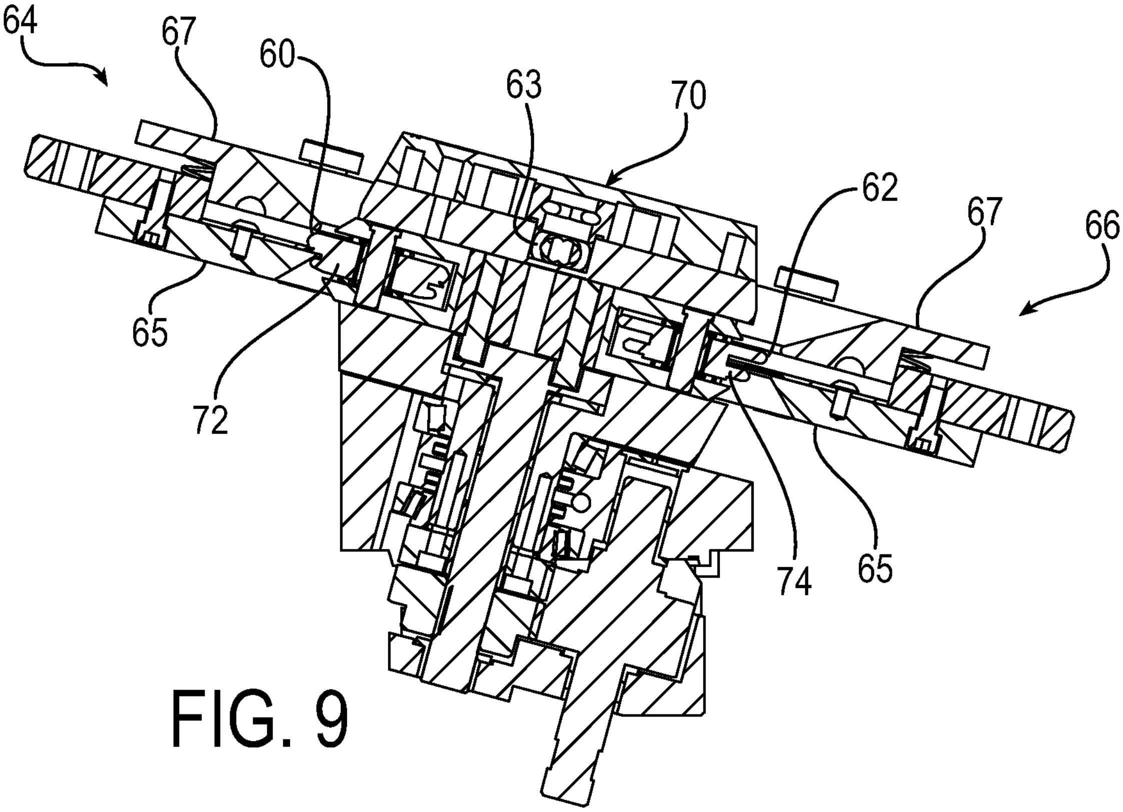
Figure 10:
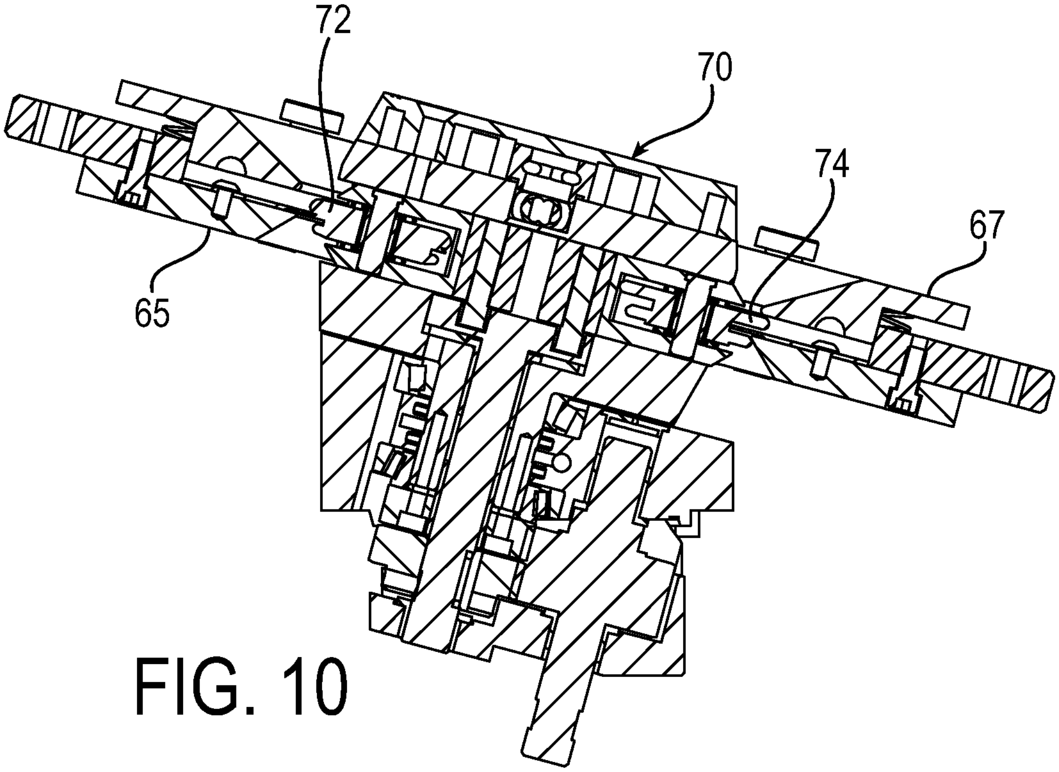

The cutting and forming system 70 is designed to cut, pre-form and finish form the connecting beads between sections or gores of the work piece 12 and can also be utilized to seal the connections after being made. As shown in FIGS. 8-10, the cutting and forming assembly 70, in association with the dies 60 and 62 operate to cut and reconnect the gore sections of the work piece 12. The dies 60 and 62 in this example are formed from a cutting plate 65 and a forming plate 67. The cutting and forming assembly includes at least one cutting roller 72 and forming roller 74, that are moveable toward and away from the cutting plate 65 and forming plate 67 to perform the cutting and pre-forming, forming and crimping operations on the work piece 12 positioned in the channel. In FIG. 9, the cutting roller 72 is shown in the advanced position to engage the work piece 12 and cut the work piece 12 in association with the cutting plate 65. In FIG. 10, the forming roller 74 is shown in the advanced position to engage the work piece 12 and reconnect the cut pieces of the work piece 12 in association with the forming plate 67.

In FIGS. 11 and 12, there is shown an example cutting and forming assembly 70 is shown in more detail, with a cutting/forming cassette removed. As seen in FIG. 11, the assembly 70 includes a rotating head 400 with a mounting section 402 to mount the cutting/forming cassette. The rotating head 400 is positioned at an angle as shown to accommodate the angled arrangement of the cutting and forming plates to provide the desired angled cutting of work piece 12 from a straight tube. The head 400 is precisely driven by a drive system 403 generally including a drive shaft 404 connected through a direct gear drive 406 to rotate shaft 408 and head 400 at a high speed, which allows cutting and forming operations to be achieved very quickly. The rotation of shaft 408 is transferred to shaft 410. The shaft 410 interfaces with the cassette when mounted at 402, and causes deployment of a cutting wheel and forming wheel as will be described in more detail hereafter. The shaft 410 rotates a drive member 412 that interfaces with a cassette mounted at 402. The drive shaft 410 is rotated at a speed to allow cutting and forming operations to be achieved very quickly in conjunction with rotation of head 400. In an example, the entire formation of the elbow from a straight tube using the machine may be performed in approximately 17 seconds. This includes positioning the straight tube work piece 12 in the machine, and cutting, forming, rotating, re-connecting the gore sections and sealing of the connections of the work piece to form the four connections resulting in the 90 degree elbow as in FIG. 2. The ability to automatically form the elbow configuration without operator intervention this quickly allows production of duct members in a very efficient and optimized manner. As the drive shaft 408 is oriented at an angle relative to drive shaft 404, the direct gear drive 406 may be a set of bevel gears coupled to a collar and directly to the drive shaft 408, to enable driving shaft 408 in a direct manner, rather than using a mechanism such as a universal joint for example. This reduces maintenance of the drive system 406. The rotation of shafts 408 and 410 are provided at selected ratios to the rotation of drive shaft 404. The positioning, cutting, rotation, forming and sealing of the connections between gore sections of the work piece 12 may be performed by computer driven servo drivers for accurate position and speed control. A servo drive receives a command signal from a computer control system to operate a servo motor in order to produce motion proportional to the command signal. The command signals produce movements of the head 400 and operation of the cassette at desired speeds, and also provide very accurate control of the position of the gore sections during elbow formation, both with respect to one another and to form each section of the elbow during construction by movement of the support surface or tub 68 and relative rotation of the gore sections for re-attachment. In an example as shown in FIG. 13, the cutting and forming assembly 70 with drive member 412 that interfaces with a cassette may be an eccentric drive 412 that causes engagement of a cutting wheel and forming wheel in succession as the head 400 rotates relative to the work piece 12. The eccentric drive allows very quick movement of the cutting and forming wheels into and out of engagement with the work piece for very efficient cutting and forming operations that allow the extremely fast operation of machine 10 to be achieved.

In an example, a cutting and forming cassette 500 is used in association with head 400, such as shown in FIGS. 14 and 15. The cassette 500 carries a cutting wheel 502 and a forming wheel 504, which are independently deployed into engagement with the work piece 12 to cause cutting of the work piece 12 into gore sections, pre-forming a coupling portion in each section, and re-attaching the gore sections via a coupling portion formed in each section. The cassette 500 is engaged by the drive member 412 in channel 506, and drive member 412 causes the cassette 500 to slide relative to mounting channel 402 in head 400, such that cutting wheel 502 and forming wheel 504 are moved outwardly and inwardly relative to work piece 12, and into and out of engagement of the work piece 12. The cutting and forming wheels operate in conjunction with cutting and forming plates as previously noted.

An example of the cutting wheel 502 is shown in FIG. 16. The cutting wheel 502 includes a profile that engages the work piece 12 to perform several functions. A first radiused portion 510 is formed at a top portion of wheel 502, and causes pre-forming of a top section of work piece as a second knife portion 512 cuts the work piece 12 into top and bottom gore sections. A second radiused portion 514 is provided at the bottom of the wheel 502 to cause pre-forming in a bottom section of the work piece 12. The top radiused portion 510 includes a varying radius from the top to the bottom thereof, and in this example comprises a first radius R1 forming portion 516 extending from the top to approximately the middle of portion 510, and a second radius R2 forming bottom section 518 of portion 510. The first radius R1 provides pre-forming of a top section of work piece 12 as it is cut with knife portion 512. The pre-forming provided by section 516 enables precise formation of a coupling bead that can then be sealed to form a flat, small dimension sealed coupling between gore sections of the work piece 12. As seen in FIG. 16, the portion 510 pre-forms a coupling bead in a top section of a work piece after being cut that has a dimension that is greater than pre-forming provided by section 514 in a bottom section of work piece after being cut. This allows the cut top and bottom section of the cut work piece 12 to then be quickly moved into overlapping relationship with the pre-formed coupling beads adjacent one another, for completion of the forming operation on the coupling beads provided by the forming wheel 504. In the operation of the cutting and forming assembly 70, a pre-forming operation may be performed as described, to simultaneously pre-form the bottom edge of the top cut section and the top edge of the bottom section with a slight inward taper to assist in moving the cut sections into overlapping relationship. The forming operation provides a second stage of crimping of the produced reconnection between gore sections, to form a predetermined reconnection that is suitably sealed after subsequent high pressure crimping by a crimping system as will hereafter be described. In general, the material from which the work piece 10 is formed is of significant structural integrity whereby the connecting beads formed are deep and consistently formed to facilitate maintaining the connection between the gores and providing the desired seal.

The operation of the cutting and forming cassette 500 provides deployment of the cutting wheel 502 and forming wheel 504 independently as shown in FIGS. 17 and 18. As the cassette 500 is driven by member 412 in cutting and forming head 400, the cutting wheel 502 is extended into engagement with the work piece 12 in conjunction with cutting and forming plates 65 and 67 as previously described. The bottom plate 65 includes a cutting knife and a radiused channels that interface with the knife portion 512 and radiused portions 510 and 514. The top plate 67 is the forming ring, and includes a radiused channel that interfaces with the forming wheel 504. As will be described in more detail hereafter, a crimping plate 59 operates to push forming plate 67 downwardly after formation of the coupling bead between gore sections, to engage the formed coupling bead and crimp or seal it tightly closed. Between the plates 65 and 67 are provided springs 79 to bias the plates to an open position after crimping of the formed coupling bead, as seen in FIG. 19. The forming ring provided by forming plate 67 creates the form of the gore before it is crimped and then is pushed down to crimp the formed coupling bead between gores of the elbow duct.

Another example of cutting and forming head is shown in FIG. 13, comprising a rotating head 300 driven by a central gear 302. The head 300 includes three cassettes 304 which are movable on a support 306. Associated cams 308 cause movement of the cassettes to move outwardly and engage the work piece as described in association with the cutting and forming wheels in each cassette 304. Other suitable configurations may be used.

Turning to FIGS. 20 and 21, there is shown a portion of the tooling to form the coupling beads between gore sections and to seal these connections after being formed, in conjunction with the cutting and forming head 400. In this example, the die assembly 58 supported adjacent the nest 56 as shown in FIG. 3, is formed by the first and second semicircular die members 60 (and 62) which are positioned on opposed sides of the nest 56. The tooling includes three plates that are stacked and attached to one another for cooperative operation. In this example, the die member 60 includes a cutting plate 65 positioned at the bottom, along with a forming plate 67 positioned above the cutting plate 65. There is a spacer 71 between plates 65 and 67 as previously described, for maintaining the spacing between the cutting and forming plates 65 and 67 during sealing the joint between gore sections of the work piece 12 after being formed. The pair of thin semicircular plates or spacer rings 71 are mounted in association with the cutting plate 65 and forming plate 67 to facilitate forming the desired sealed connections between gore sections in association with the operation of crimping plate 59. The spacers 71 may be about 0.040", for example, and maintain the spacing between portions of the formed connection between gore sections of the work piece 12 to properly seal the connection after being formed.

There is also provided an upper holding system 81 that may be used in addition to the holding system 63 as previously described. The holding system 81 ensures that the upper gore section of the work piece 12 after cutting remains in the proper position for re-attachment to the lower gore section. In operation, after cutting of the work piece 12 at a location x in FIG. 1, to form the elbow configuration, the cut gore sections are rotated relative to one another before re-attaching. The relative rotation between the parts should be precise to ensure the ultimate 90 degree elbow configuration is formed properly, and maintaining the desired position of the upper gore section relative to the lower gore section during cutting is facilitated by the upper holding system 81. The upper holding system 81 in this example is a slidable plate movable between engaged and disengaged positions by an actuator 85 (as shown in FIG. 22), that moves into and out of engagement with angled surfaces 83 formed on opposing plates 81 to move plates 81 into engagement with the top gore section. Return springs 87 are provided to move plates 81 out of engagement upon movement of actuator 87 out of engagement with surfaces 83. The holding system 81 operates independently to allow secure holding of the top gore section during the cutting operation.

After formation of the connecting beads, the beads may be crimped and sealed to substantially prevent the egress of air therethrough. As shown in FIG. 22, a crimping assembly 59 or plate is provided above the die assemblies 60 and 62 and moved downwardly against the forming plates 67 to cause downward movement of the forming plate 67 against the formed connecting beads in each gore section. This applies force to the formed connecting beads to seal the connecting beads. In this example, the crimping plate 59 is moved by twin servo driven ball screws 77 on opposing sides, controlled by a computer driven servo drive. The use of twin servo driven ball screws 77 ensures that each portion of the formed connecting beads are properly and evenly sealed. Other suitable systems for crimping may be used. A block diagram of an exemplary, non-limiting embodiment to describe operation of the system is shown in FIG. 23. Operation of the apparatus and components may be controlled by a control system, including a computing device that may comprise one or more processor(s) configured to execute computer-executable instructions, such as instructions composing operation of one or more components of the machine 50. Such computer-executable instructions can be stored on one or more computer-readable media including a non-transitory, computer-readable storage medium such as memory associated with the computing device.

In general, once the work piece 12 is positioned in nest 56, the operation is started at 100. The bottom clamp 61 is closed at 102 to secure the work piece 12 into positon. The work piece is moved to the position of a first cut at 104 by the moving system 55 and may be rotated 180 degrees clockwise at 106 by the clamping and rotating assembly. The first top holding system or clamp assembly 63 is closed at 108 and the secondary top clamping device 81 is closed at 109 to ensure the top duct section does not move during a first cutting operation performed at 110. The cutting operation is performed by the cutting and forming system 70, which will initially cut the work piece along a predetermined angular position defined by the angle of the die members 60 and 62 and cutting and forming assembly 70 relative to the work piece 12 positioned within the channel. The cutting operation is performed by engaging the cutting wheel 72 with the work piece in association with the cutting plate 65. Once the work piece is cut by the cutting and forming system 70, the top secondary holding system 81 is disengaged at 111 and a support surface or tub 68 is moved up a predetermined amount, such as between 0.03 to 0.10 inches, or in this example, 0.060 inches, at 112, to position a portion of the cut section relative to the cutting and forming system 70. The cutting and forming assembly 70 is then operated to pre-form a portion of the work piece by engaging the turning head of system 70 at 114 to engage the forming wheel 74 with the work piece. The top section of the cut work piece is then rotated 180 degrees clockwise at 116, and the turning head is disengaged at 118. At this point, the machine operation performs a breed lift operation at 120. After being cut and pre-formed, the breed lift causes the bottom section of tube to be inserted into an overlapping position with the top section. A pre-crimping operation is performed at 122, to form a portion of the work piece for subsequent sealing. The semi-circular rings associated with the cutting and forming assembly 70 facilitate controlling the flow or forming of material of the work piece during the breeding and pre-crimping processes. Thereafter, a forming operation is performed at 124, wherein the forming wheel in association with the forming plate produce a connecting bead in the work piece sections to reconnect the sections. The forming operation provides a second stage of crimping of the produced reconnection between gore sections, to form a reconnection that is suitably sealed after subsequent high pressure crimping by a crimping plate 59. A step of moving of the crimping plate 59 is performed at 126 to provide a final or third stage of crimping at 128 and tightly seal the reconnection between gore sections. The pressure applied by the crimping plate 59 may be controllable and adjustable if desired. At this point, the first sealed connecting bead is formed between gores or sections in the work piece 12.

As noted from the first operation, after cutting and pre-forming the connecting bead, the machine will automatically turn the first section 180 degrees, and then machine will complete the forming operation of the connecting bead. After the connecting bead is complete, the crimping plate 59 will apply pressure and make a tight non-adjustable seal. The machine can produce an adjustable duct member by not using full pressure on the crimping process if desired.

The tub 68 is then moved to the position to form the second connecting bead at 132, and is rotated 180 degrees counter clockwise at 134. The top clamp 63 is closed at 136 and a secondary top clamp is closed at 137. A cutting operation performed at 138, and secondary top clamp 81 is opened at 139. As in the first connecting bead forming operation, the tub is moved up an amount, such as 0.060 inches at 140 and the turning head is engaged at 142. The top cut section is then rotated 180 degrees clockwise at 144, and the turning head disengaged at 146. The breed lift is performed at 148 and pre-crimping at 150. A second forming operation is then performed at 152, to form the second connecting bead. The forming operation provides a second stage of crimping of the produced reconnection between gore sections, to form a reconnection that is suitably sealed after subsequent high pressure crimping by a crimping plate 59. The crimping plate 59 is operated at 154 to crimp the formed connecting bead at 156. The top clamp 63 is then opened at 158, and the sealed second connecting bead is formed between gores or sections.

The tub 68 is then moved to the position to form the third connecting bead at 160, and is rotated 180 degrees clockwise at 162. The top clamp 63 is closed at 164 and a secondary top clamp 81 is closed at 165. A cutting operation is performed at 166, and secondary top clamp 81 opened at 167. As in the first and second connecting bead forming operations, the tub is moved up an amount, such as 0.060 inches at 168 and the turning head is engaged at 170. The top cut section is then rotated 180 degrees clockwise at 172, and the turning head disengaged at 174. The breed lift is performed at 176 and pre-crimping at 178. A third forming operation is then performed at 180, to form the third connecting bead. The forming operation provides a second stage of crimping of the produced reconnection between gore sections, to form a reconnection that is suitably sealed after subsequent high pressure crimping by a crimping plate 59. The crimping plate is operated at 182 to crimp the formed connecting bead at 184. The top clamp 63 is then opened at 186, and the sealed third connecting bead is formed between gores or sections.

The tub 68 is then moved to the position to form the fourth connecting bead at 188, and is rotated 180 degrees counter clockwise at 190. The top clamp 63 is closed at 192 and secondary top clamp 81 closed at 193. A fourth cutting operation is performed at 194, and secondary top clamp 81 opened at 195. As in the prior connecting bead forming operations, the tub is moved up an amount, such as 0.060 inches at 196 and the turning head is engaged at 198. The top cut section is then rotated 180 degrees clockwise at 200, and the turning head disengaged at 202. The breed lift is performed at 204 and pre-crimping at 206. A fourth forming operation is then performed at 208, to form the fourth connecting bead between gores. The forming operation provides a second stage of crimping of the produced reconnection between gore sections, to form a reconnection that is suitably sealed after subsequent high pressure crimping by a crimping plate 59. The crimping plate is lifted at 210 to crimp the formed connecting bead at 212. The top clamp 63 is then opened at 214, and the sealed fourth connecting bead is formed, and the part is now formed into a sealed 90 degree elbow in final form, without operator intervention except to position work piece 12 and remove the final form, sealed elbow duct member.

In the above operations, each step may be performed automatically. As seen in FIG. 24, a control system 250 for the machine 50 may be provided by suitable systems, such as computer, including processor(s), PLC controllers or any other suitable system. A computer typically includes a variety of computer readable media and can be any available media that can be accessed by computer. The system memory may include computer storage media in the form of volatile and/or nonvolatile memory such as read only memory (ROM) and/or random access memory (RAM). By way of example, and not limitation, there may be provided an operating system, application programs, other program modules, and program data. A user or operator is enabled to enter commands and information into the computer. In this example, the control system 250 includes a touch screen to allow setting and selection of operation of machine 50, which may be by an unskilled operator. The machine 50 may be started at 251 and set up in automatic mode at 252. Recipes or predetermined operational steps such as outlined in the above example, may be set in relation to the production of desired duct members, and such recipes may be called up and implemented automatically at button 254. In this way, an unskilled operator can simply recall a particular recipe for the type of duct member to be produced, alleviating the necessity for a skilled operator and simplifying the manufacturing process. A manual mode may be provided at 256. A machine drive reset button 258 may be provided to reset the starting position of the machine if needed. A parts counter 260 may be provided, with a reset button at 262. Indicators may be provided to indicate operation of systems as noted, and an emergency stop button 264 may be provided for emergencies. But, as noted above, the formation of the duct member is automatically performed on a work piece 10 inserted into the channel, and there are no further actions by an operator required.

The control system 250 also provides access to control all machine functions, such as the top clamp 63 at 266, bottom clamp 61 at 268, and the crimping system at 270, including a low pressure crimp option at 271. The cutting and forming head may be controlled at 272, while tub movement is controllable at 274. Rotational movement of the tub or top clamp is controllable at 276. Other functionality may be provided, such as setting the desired positions of connecting beads to form the gores of the duct member at 278 for example, or any other requirements as may be desired.

While the above description has been presented with specific relation to particular examples of the systems and methods, it is to be understood that the claimed invention is not to be limited thereby. Illustrative embodiments have been described, hereinabove. It will be apparent to those skilled in the art that the above devices and methods may incorporate changes and modifications without departing from the general scope of the claimed subject matter. It is intended to include all such modifications and alterations within the scope of the claimed subject matter. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A method of forming a sealed duct member comprising,
- providing a blank work piece and positioning the work piece in a work station at a starting position, automatically forming the sealed duct member from the blank work piece by:
- clamping the work piece and moving the work piece to a position where a cut is to be made,
- clamping the work piece above the position where a cut is to be made,
- cutting and pre-forming the work piece to form first and second sections, wherein the pre-forming produces different predetermined radiused portions in the first and second sections adjacent the cut, the radiused portions pre-crimping the first and second sections in a first crimping stage,
- moving the first section toward the second section a predetermined amount,
- rotating the second section relative to the first section,
- forming connecting beads in each of the first and second sections using at least one die member and at least one forming wheel, the connecting beads reconnecting to reconnect the first and second sections and the least one forming wheel configured to provide a second stage of crimping, and
- crimping the formed connecting beads together by forcing at least one crimping plate positioned above the connecting beads downwardly under pressure in a third stage of crimping to form a flat sealed connection between the first and second sections.

2. The method of claim 1, where a plurality of recipes for manufacture of predetermined duct members are provided, and an operator selects a recipe and positions the blank work piece in the work station to automatically produce a selected predetermined duct member without further intervention by the operator.

3. The method of claim 2, wherein a recipe for an elbow duct configuration may be selected by the operator to automatically form the elbow duct configuration from a blank cylindrical work piece.

4. The method of claim 1, wherein the at least one die member has a top surface and the at least one crimping plate engages the top surface of the at least one die member under pressure to crimp and evenly seal the first and second sections into the flat sealed connection.

5. The method of claim 1, wherein the clamping the work piece above the position where a cut is to be made is performed by a first top clamp engaging the interior of the first section above the position where a cut is to be made and secondary top clamp engaging the exterior of the first section above the position where a cut is to be made.

6. The method of claim 1, wherein at least one cutting plate is provided to cut the work piece and at least one forming plate is provided adjacent the at least one cutting plate to form the connecting beads and at least one spacer is positioned between the at least one cutting plate and the at least one forming plate.

7. The method of claim 1, wherein the pre-crimping of the first and second sections in the first crimping stage is performed by forming the different radiused portions in the first and second sections to form the flat sealed connection after the second and third stage crimping operations are performed.

8. The method of claim 7, wherein the radiused portion in the first section is formed with multiple radii.

9. The method of claim 8, wherein the multiple radii include a first radius and a second radius, wherein the first radius pre-forms a portion of the first section to allow the third stage crimping operation to form the flat sealed coupling.

10. The method of claim 1, wherein at least one cutting wheel is used for cutting and pre-forming the workpiece that includes a first radiused portion, a knife portion and second radiused portion, wherein the first and a second radiused portions pre-form the first and second sections upon being cut by the knife portion, and wherein the first radiused portion has a dimension that is greater than the second radiused portion.

11. The method of claim 1, wherein top and bottom clamps are sequentially operated to secure and rotate the first and second sections relative to one another.

12. The method of claim 1, wherein a forming wheel is used to form the connecting beads in each of the first and second sections, with the forming wheel having a section interfacing with the at least one die member to provide the shape of the connecting beads for the second stage of crimping.

13. The method of claim 1, wherein the at least one crimping plate is moved downwardly by twin servo driven ball screws on opposing sides of the at least one crimping plate.

14. The method of claim 1, wherein the second stage of crimping is performed after reconnection of the first and second sections of the work piece by forming the connecting beads to produce the flat sealed connection with the crimping plate in the third stage of crimping.

15. The method of claim 1, wherein the first and second sections are automatically rotated 180 degrees relative to one another before being reconnected and the work piece is automatically rotated in either clockwise or counterclockwise directions after reconnection of the first and second sections.

* * * * *